United States Patent
Zetzl et al.

(10) Patent No.: US 11,368,887 B2
(45) Date of Patent: Jun. 21, 2022

(54) METHOD FOR PRIORITIZING PUSH-TO-TALK SERVICE IN A ROAMED NETWORK

(71) Applicant: MOTOROLA SOLUTIONS, INC, Chicago, IL (US)

(72) Inventors: Daniel P. Zetzl, Bartlett, IL (US); Ethan Y. Chen, Wilmette, IL (US); Mark Shahaf, Vernon Hills, IL (US); Mark Wealleans, Andover (GB)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 266 days.

(21) Appl. No.: 15/958,320

(22) Filed: Apr. 20, 2018

(65) Prior Publication Data
US 2019/0327654 A1    Oct. 24, 2019

(51) Int. Cl.
| | | |
|---|---|---|
| *H04W 36/08* | (2009.01) | |
| *H04W 76/16* | (2018.01) | |
| *H04W 76/45* | (2018.01) | |
| *H04W 4/10* | (2009.01) | |
| *H04W 4/08* | (2009.01) | |

(52) U.S. Cl.
CPC ............ *H04W 36/08* (2013.01); *H04W 4/10* (2013.01); *H04W 76/16* (2018.02); *H04W 76/45* (2018.02); *H04W 4/08* (2013.01)

(58) Field of Classification Search
None
See application file for complete search history.

(56) References Cited

U.S. PATENT DOCUMENTS

| | | | |
|---|---|---|---|
| 7,065,367 B2 | 6/2006 | Michaelis et al. | |
| 8,477,752 B2 | 7/2013 | Hietalahti et al. | |
| 8,787,869 B2 | 7/2014 | Watson et al. | |
| 9,462,523 B2 | 10/2016 | Zisimopoulos et al. | |
| 9,491,666 B2 | 11/2016 | Tiwari | |
| 9,723,528 B2 | 8/2017 | Ling et al. | |
| 2010/0098241 A1* | 4/2010 | Laster | H04Q 3/005 379/221.13 |
| 2010/0208624 A1 | 8/2010 | Vikberg et al. | |
| 2010/0285797 A1* | 11/2010 | Ghai | H04W 36/385 455/426.1 |
| 2013/0028146 A1* | 1/2013 | Stacker | H04M 7/1265 370/259 |
| 2014/0370834 A1 | 12/2014 | Liu et al. | |
| 2015/0009865 A1* | 1/2015 | Sharma | H04L 5/16 370/277 |
| 2015/0057026 A1 | 2/2015 | Mikan | |
| 2015/0110005 A1 | 4/2015 | Hammer et al. | |
| 2017/0142756 A1 | 5/2017 | Lee | |
| 2017/0339535 A1* | 11/2017 | Mazzarella | H04M 3/56 |
| 2019/0053306 A1* | 2/2019 | Cho | H04W 8/08 |

FOREIGN PATENT DOCUMENTS

WO    2006037372 A1    4/2006

* cited by examiner

*Primary Examiner* — Christine T Duong
(74) *Attorney, Agent, or Firm* — John Macintyre; Barbara R Doutre

(57) ABSTRACT

A method is provided that allows for prioritizing Push-To-Talk (PTT) service in a roamed network. PTT service is enabled for a mobile device at a first network. The mobile device roams to a second network that is of an older generation than the first network. It is determined that the mobile device has an active PTT subscription. PTT service is prioritized for the mobile device over circuit switched services on the second network.

17 Claims, 2 Drawing Sheets

METHOD FOR PRIORITIZING PUSH-TO-TALK SERVICE IN A ROAMED NETWORK

BACKGROUND OF THE INVENTION

Land Mobile Radio (LMR) communication systems provide a single grade of service for voice and data. Public Safety users will expect the same level of service when using a commercial broadband network. However, the service level at commercial broadband networks can vary depending on the network operating mode; such as 4G (LTE), 3G (HSPA/UMTS/EvDO), or 2G (GPRS/EDGE).

In LMR communication systems an emergency voice call is always a reliable service that can be prioritized over other services. However, for a user of PTT (Push-To-Talk) services over a broadband data network, the level of service can be degraded if the network drops from 4G to either 3G or 2G.

If a mobile device roams to a 3G network from a 4G network, an ongoing voice circuit switched call could prevent a user from initiating a priority or emergency PTT call. Likewise an ongoing PTT call could be interrupted by an incoming circuit switched voice call as the service interactions in LTE will no longer be available, since in 3G and 2G communication systems voice calls have the highest priority.

Therefore, a need exists for a method of reliably initiating PTT calls when roaming. In addition, a need exists for a method ensuring that ongoing PTT calls are not interrupted by incoming voice calls.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
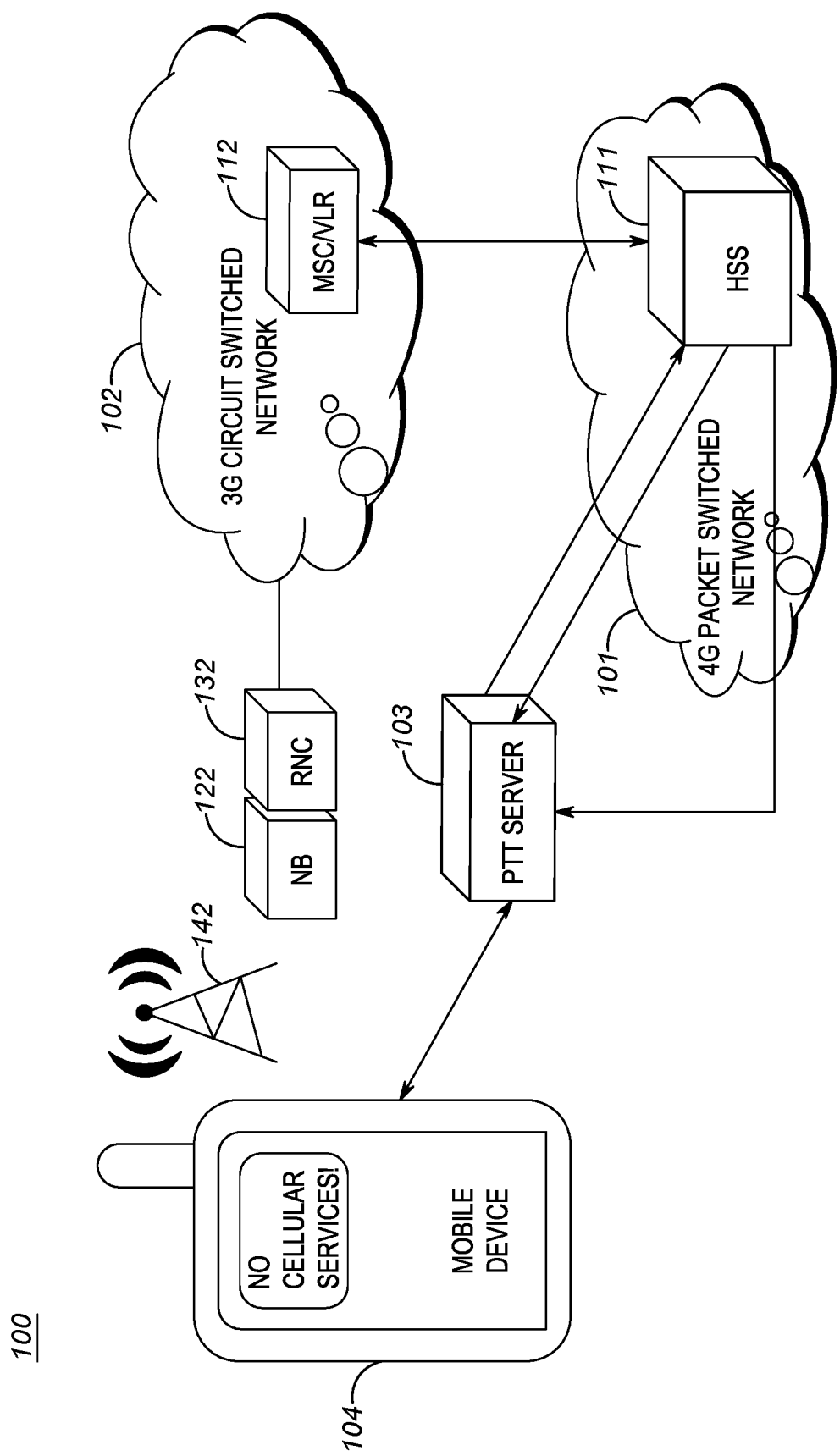
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a communication system 100 in accordance with an exemplary embodiment of the present invention. Communication system 100 preferably includes 4G Packet Switched Network 101, 3G Circuit Switched Network 102, PTT Server 103, and Mobile Device 104.

4G Packet Switched Network 101 includes HSS 111. HSS 111 is a master user database that includes subscriber profiles and subscription related information. HSS 111 performs authentications and authorization of users and provides information about the location of a subscriber and IP information.

3G Circuit Switched Network 102 includes MSC/VLR 112, Node B 122, RNC (Radio Network Controller) 132, and cell tower 142.

MSC/VLR 112 is a database of mobile units that have roamed into the jurisdiction of the MSC (Mobile Switching Center) that MSC/VLR 112 serves. In accordance with an exemplary embodiment, each MSC/VLR 112, is depicted in FIG. 1 for clarity. In this manner, a mobile unit can only be registered in one VLR at any given time. MSC/VLR 112 can be a standalone server, but is typically incorporated into an MSC for performance reasons. MSC/VLR 112 preferably stores multiple fields relating to each mobile unit, including but not limited to the IMSI of the mobile unit, authentication data, the phone number of the mobile unit, services that the mobile unit is able to access, and the HLR of the mobile unit.

NB 122 is hardware that connects to cell tower 142 and communicates directly wirelessly with mobile units via cell tower 142. NB 122 is preferably controlled by RNC 132.

RNC 132 is a governing element in communication system 100. RNC 132 is responsible for controlling NB 122. RNC 132 preferably performs radio resource management, certain mobility management functions, and particular encryption functions. RNC 132 is typically connected to 3G Circuit Switched Network 102, which is not depicted in FIG. 1 for clarity. RNC 132 also preferably controls the power of NB 122.

Cell tower 142 is a cellular-enabled mobile device site where antennae and electronic communications equipment are placed to create a cell in a cellular network. Cell tower 142 preferably includes antennae and one or more sets of transmitter/receivers transceivers, digital signal processors, control electronics, a GPS receiver for timing (for CDMA2000/IS-95 or GSM systems), primary and backup electrical power sources, and sheltering.

PTT Server 103 is a computing device that manages and facilitates Push-To-Talk communications within communication system 100. PTT Server 103 is coupled with HSS 111 and mobile device 104.

Mobile Device 104 is a portable telephone that can make and receive calls over a radio frequency link while the user is moving within a telephone service area. Mobile Device 104 is preferably configured for Mission Critical PTT Services over a packet switched data connection.

Figure 2:
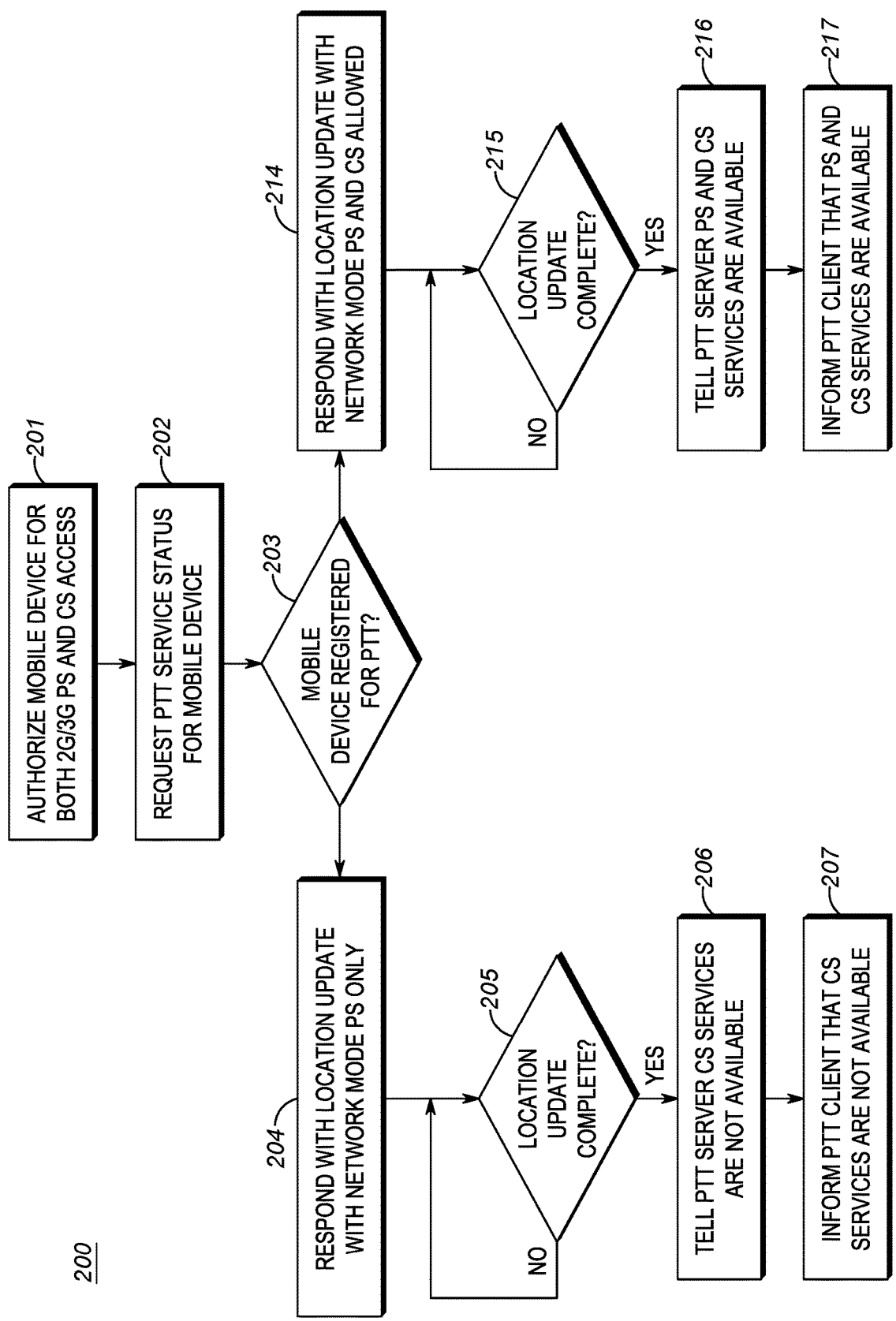
FIG. 2 depicts a flow chart in accordance with an exemplary embodiment of the present invention.

FIG. 2 depicts a flow chart 200 in accordance with an exemplary embodiment of the present invention. In this exemplary embodiment, mobile device 104 is configured for Mission Critical PTT Services over a packet switched data connection and roams from 4G Packet Switched Network 101 to 3G Circuit Switched Network 102.

Upon roaming into 3G Circuit Switched Network 102, mobile device 104 registers with MSC/VLR 112. MSC/VLR 112 requests authorization from HSS 111. HSS 111 authorizes (201) mobile device 104 for both 2G/3G packet switched and circuit switched access.

HSS 111 requests (202) the PTT Service Status of mobile device 104 from PTT Server 103. In accordance with an exemplary embodiment, the request includes the device ID of mobile device 104.

HSS 111 receives a response from PTT Server 103 and determines (203) if mobile device 104 is registered for PTT service. In an exemplary embodiment, PTT Server 103 responds with a "Y" if mobile unit 104 is registered for PTT services and an "N" if Mobile Device 104 is not registered for PTT services. Alternately, PTT Server may respond with an identifier of mobile device 104 is mobile device 104 is registered for PTT service and with an error code of mobile device 14 is not registered for PTT service.

If mobile device 104 is registered for PTT service as determined at step 203, HSS 111 responds (204) to MSC/VLR 112 with a Location Update that indicates that mobile device 104 is only able to communicate with the network in packet-switched mode. In an exemplary embodiment, this is done by sending a location update command to MSC/VLR 112 with subscription data set to only packet switched services. In this embodiment, Circuit Switched services are not enabled for mobile device 104.

HSS 111 determines (205) if the location update is complete. If the location update is not complete, the location update continues.

If the location update is complete, HSS 111 tells (206) PTT Server 103 that circuit switched services are not available for mobile device 104.

PTT Server 103 informs (207) a PTT Client on mobile device 104 that circuit switched services are not available.

If mobile device 104 is not registered for PTT as determined at step 203, HSS 111 responds (214) with a Location Update that indicates that mobile device 104 is able to communicate with the network in packet-switched or circuit-switched mode.

HSS 111 determines (215) if the location update is complete. If the location update is not complete, the location update continues.

If the location update is complete, HSS 111 tells (216) PTT Server 103 that packet switched and circuit switched services are available for mobile device 104.

PTT Server 103 informs (207) a PTT Client on mobile device 104 that packet switched and circuit switched services are not available.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   enabling a mobile device for mission critical Push-To-Talk (PTT) service over a packet switched data connection of a first network;
   roaming, by the mobile device, to a second network, the second network being of an older generation and different network that operates using circuit switched services that prioritize circuit switched calls;
   determining that the mobile device has an active PTT subscription; and
   prioritizing mission critical PTT service over the circuit switched calls for the mobile device operating over the circuit switched services on the second network.

2. The method of claim 1, the method further comprising providing an indication on the mobile device that indicates that mission critical PTT service is prioritized for the mobile device over circuit switched services on the second network.

3. The method of claim 2, wherein the indication on t obile device is a visual indicator on the mobile device.

4. The method of claim 2, wherein the indication on the mobile device is an audio indicator on the mobile device.

5. The method of claim 1, the method furth ising blocking incoming circuit switched voice calls.

6. The method of claim 1, the method further comprising disconnecting an ongoing voice call on the mobile device when a priority mission critical PTT call is placed at the mobile device.

7. The method of claim 1, wherein the step of determining that the mobile device has an active PTT subscription comprises receiving an identifier associated with the mobile device.

8. The method of claim 7, the method further comprising sending a message to a PTT server, the message indicating that circuit switched services are not enabled for the mobile device at the second network.

9. The method of claim 1, the method further comprising:
   detecting that the mobile device has roamed back into the first network; and
   sending a location update command by a Home Subscriber Server, the location update command indicating that the mobile device is enabled for all allowed services.

10. The method of claim 9, the method further comprising clearing a isi or Location Register at the second network of records related to the mobile device.

11. The method of claim 9, the method further comprising restoring services for the mobile device on the first network.

12. A communication system comprising a processor, the processor configured to:
   enable a mobile device for mission critical Push-To-Talk (PTT) service over a packet switched data connection of a first network;
   detect that the mobile device has roamed to a second network, the second network being of an older generation and different network that operates using circuit switched services that prioritize circuit switched calls;
   determine that the mobile device has an active PTT subscription; and
   prioritize mission critical PTT service over the circuit switched calls for the mobile device operating over the circuit switched services on the second network.

13. The communication system of claim 12, wherein the processor is further configured to block incoming circuit switched voice calls.

14. The communication system of claim 12, wherein the processor is further configured to disconnect an ongoing voice call on the mobile device when a priority mission critical PTT call is placed at the mobile device.

15. The communication system of claim 12, wherein the processor is further configured to:
   detect that the mobile device has roamed back into the first network; and
   send a location update command by a Home Subscriber Server, the location update command indicating that the mobile device is enabled for all allowed services.

16. The method of claim 1, wherein the mobile device roams from a 4G packet switched network to a 3G circuit switched network.

17. The communication system of claim 12, wherein the mobile device roams from a 4G packet switched network to a 3G circuit switched network.

* * * * *